United States Patent [19]
Rethmeier

[11] 3,743,178
[45] July 3, 1973

[54] CONTROL DEVICE FOR TOTALIZING MECHANISMS OF REGISTERING BUSINESS MACHINES

[75] Inventor: Gerhard Rethmeier, Oldentrup, Germany

[73] Assignee: Anker-Werke AG, Bielefeld, Germany

[22] Filed: Sept. 28, 1970

[21] Appl. No.: 75,878

[30] Foreign Application Priority Data
Sept. 27, 1969 Germany............ P 19 48 976.0

[52] U.S. Cl............ 235/60 MT, 235/62 F, 235/2
[51] Int. Cl............................................. G06c 21/00
[58] Field of Search............ 235/2, 6, 7 R, 60 MT, 235/60 R, 62 F

[56] References Cited
UNITED STATES PATENTS
3,181,784  5/1965  Becker............................ 235/2

Primary Examiner—Stephen J. Tomsky
Attorney—Curt M. Avery, Arthur E. Wilfond, Herbert L. Lerner and Daniel J. Tick

[57] ABSTRACT

Control device for totalizing mechanisms of registering business machines includes a plurality of calculating mechanisms including a plurality of summing mechanisms and a plurality of totalizing mechanisms, the plurality of totalizing mechanisms respectively having positive and negative calculating wheels, clutch members connected to the totalizing mechanisms, a plurality of calculating mechanism selector means operatively connected to the clutch members for acting thereon so as to select a respective individual totalizing mechanism from the plurality of totalizing mechanisms, control and calculating mechanism selector banks, at least one thereof having a differential mechanism operatively connected to the calculating mechanism selector means, respectively, for setting the same, each of the totalizing mechanisms being adjustable for activating the positive and negative calculating wheels thereof, the totalizing mechanisms being activatable and selectable by the same one of the calculating mechanism selector means.

9 Claims, 12 Drawing Figures

Patented July 3, 1973

CONTROL DEVICE FOR TOTALIZING MECHANISMS OF REGISTERING BUSINESS MACHINES

My invention relates to control device for totalizing mechanisms of registering business machines and more particularly to such mechanisms wherein the individual totalizing mechanisms are selectable by adding or summing mechanism selector means acting on clutch members that are connected to the respective totalizing mechanisms, the summing mechanism selector means being set by means of differential mechanisms of control or summing mechanism selector key banks of the business machine.

In a heretofore known control device for totalizing mechanisms of registering business machines, the shifting of the totalizing mechanism for selecting the positive or negative calculating wheels is effected by means of a sensor-controlled device whose displacement of adjustment is made dependent upon a control cam which is transferable by a control key of the mode-of-operation or the summing mechanism selector bank into the respective operative position thereof. The clutch of the totalizing mechanism and mode-of-operation rails, which impart the inward and outward swinging movements of the calculating wheels to toothed segments provided for transferring values, is effected, in contrast, by sensing members which, during the clutching operation, sense control rails, that are influenced or controlled by differential mechanisms of the mode-of-operation and summing mechanism selector bank, the respective positions of which are determined by the depressed keys. A disadvantage thereof is that with this control device the selection of the totalizing mechanism as well as the control of the positive or negative calculating wheels thereof are effected by manual and by automatically adjustable control means.

In view of the fact that ever greater requirements are being made on registering business machines with respect to the multiplicity of data to be registered, a very considerable increase of summing and totalizing mechanisms, referred to herein, generically, as calculating mechanisms, has resulted in these machines, the activation of which has become increasingly complex.

It is accordingly an object of my invention to provide control device for totalizing mechanisms of registering business machines wherein the activation of the summing and totalizing mechanisms is simplified over that of the heretofore known mechanisms of this general type.

It is another object of the invention to provide control device of the aforementioned type which facilitates servicing of the business machines, especially since, in the case of many machine runs the simultaneous selection of several summing and totalizing mechanisms, the positive and/or negative activation of one or more totalizing mechanisms as well as the simultaneous operation of several calculating mechanisms in varying modes of operation for one and the same machine run, are required.

With the foregoing and other objects in view, I provide in accordance with my invention, an exceptionally flexible control device for the summing and totalizing mechanisms of registering business machines in which selection and setting operations determined by control and calculating mechanism selector keys are effected by automatic calculating mechanism selector means whose setting is produced by differential mechanisms coordinated with the control and calculating mechanism selector banks.

More specifically in accordance with my invention, I provide control device for totalizing mechanisms of registering business machines, wherein the individual totalizing mechanisms are automatically selectable by calculating mechanism selector means operatively connected to clutch members that are, in turn, connected to the totalizing mechanisms. The setting of the calculating mechanism selector means is affected by differential mechanisms of the control or calculating mechanism selector key banks, and the totalizing mechanisms which are settable for activating the positive and negative calculating wheels are activated and selected by the same calculating mechanism selector means.

The shifting of the totalizing mechanism for selecting the positive and negative calculating wheels permits the simultaneous activation and selection of the totalizing mechanisms by means of keys of a plurality of key banks.

In accordance with a further feature of the invention, the machine operational mode to be selected and the activation of the summing and totalizing mechanism are determinable by a single control key or by a combination of depressed control and calculating mechanism selector keys, that are coordinated with a plurality of key banks.

Further features of my invention are that the control and calculating mechanism selector keys are substantially released by the automatic calculating mechanism selector means which, in addition to the selector function also assume the activation of the positive and negative calculating wheels of the totalizing mechanisms, since the control sliders heretofore required for this purpose are dispensed with.

By the coordination of the activating and selecting function for the totalizing mechanisms to the automatic calculating mechanism selector means, further advantages are obtained with respect to the economizing of components and improved utilization of available space.

Other features which are considered as characteristic for the invention are set forth in the appended claims.

Although the invention is illustrated and described herein as embodied in control device for totalizing mechanisms of registering business machines, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, in which.

Figure 1:
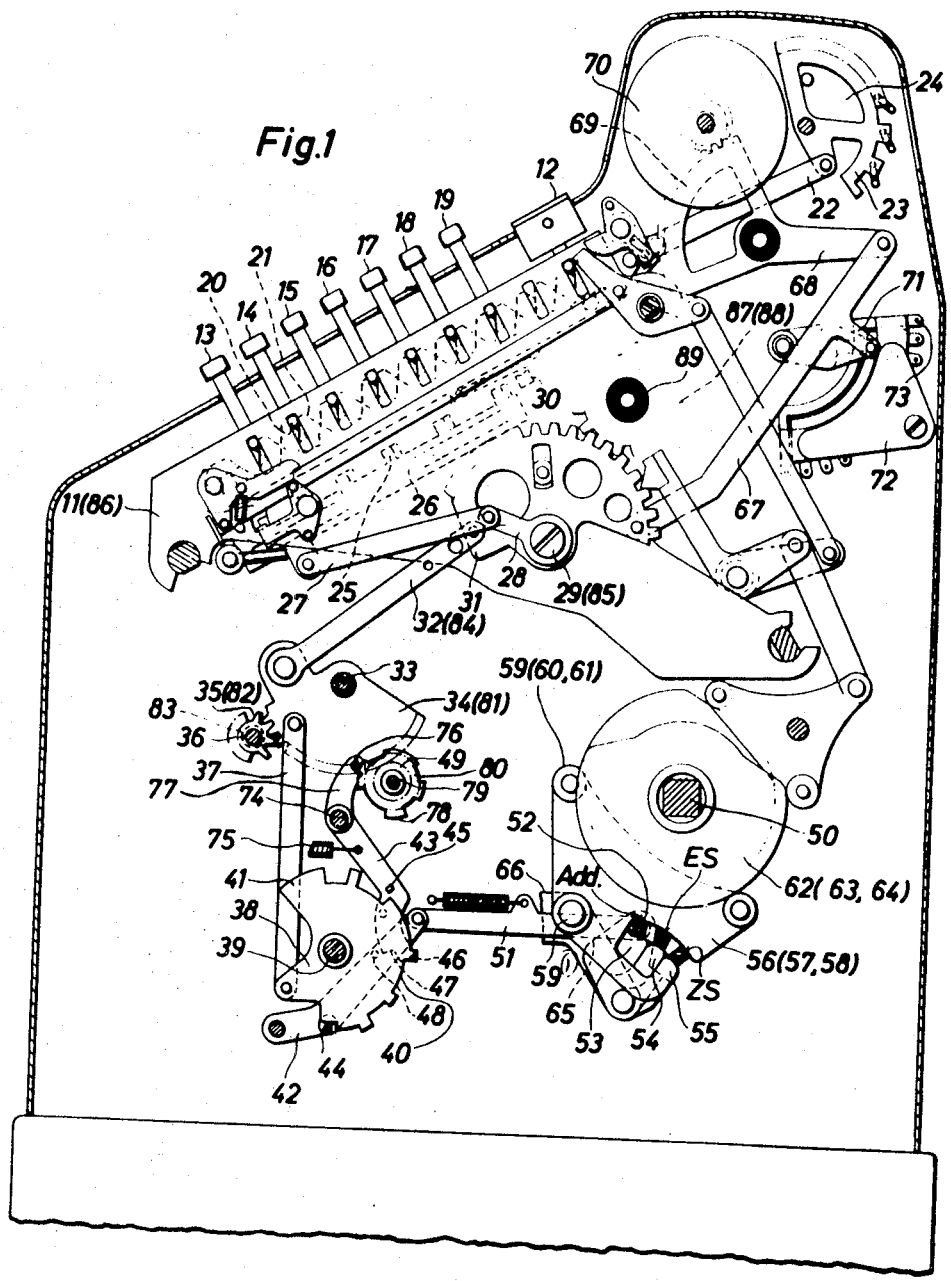
FIG. 1 is a cross-sectional view of a bookkeeping machine according to the invention.

Referring now to the drawings and first, particularly, to FIG. 1 thereof, there is shown therein a bookkeeping machine according to the invention having a mode-of-operation bank 11 with a key lock 12 and control keys 13 to 19. The control keys 13 to 19 are provided with pins 20 which act on control sliders 21 which cooperate through a driver or linkage 22 with blocking segments 23 of a blocking device 24 which serves to release the bookkeeping machine runs in a conventional manner. The operational mode bank 11 is coordinated with a control mechanism slider 26 provided with abutments or stops 25. The control mechanism slider 26 is adjustable through a linkage or driver 27 by means of a sensing member 28 of a differential control mechanism 29 which, at the beginning of a machine run, displaces the control mechanism slider 26 so far to the right-hand side, as viewed in FIG. 1, until one of the stops thereof comes into engagement with a shaft 30 of a depressed control key 13 to 19 or of the key lock 12 and, before the completion of the initiated machine run, transfers the control mechanism slider 26 into the starting position thereof. The differential control mechanism 29 is furnished with a toothed segment 31 which, through a linkage or driver 32, controls or affects a toothed segment 34 that is rotatable about a bearing pin 33, the toothed segment 34 being in meshing engagement with a pinion 35 that is secured to an adjusting shaft 36. A linkage or driver 37 is pivotally mounted on the toothed segment 34 and is connected to a control disc 38 which is rotatably mounted on a pin 39 and provided with control profiles 40 and 41 that cooperate with sensing pins 44 and 45 secured to sensing levers 42 and 43. The sensing lever 43 is provided with a lower crank-shaped end which is provided with two stepwise disposed stops 46 and 47 which, in the starting position, do not have any effect on a pin 48 secured to the sensing lever 42. Both sensing levers 42 and 43 are raised out, at the beginning of the machine run, by means of a non-illustrated mechanism driven by a main shaft 50 of the bookkeeping or business machine and, after the adjustment of the coordinated control discs 38 and 49, are again released. A spring-loaded coupling or control rod 51 is pivotally secured to the sensing lever 42 and is provided with a coupling shaft 52 of square cross section which cooperates with one of the stops 53 to 55 that are coordinated with the sensing levers 56 to 58. The sensing levers 56 to 58 are provided with sensing rollers 59 to 61 that are driven by means of cam disc pairs 62 to 64 which are securely mounted on the main shaft 50 of the business machine. The sensing levers 56 to 58 are mounted on a fixed pin 59 and influence or affect, through the coupling shaft 52 that is rotatably disposed on a rocker arm 65, a bellcrank 66 whose function will be described hereinafter in greater detail. The cam disc pairs 62 to 64 produce the adjusting movements which are carried out by the calculating mechanisms, yet to be described hereinafter, when carrying out the functions or operational modes of addition, subtotal and sum total.

A tie or tension rod 67 is suspended from the toothed segment 31 of the differential control mechanism 29 and pivotally connected to an arm 68 of an adjusting segment 69 which serves for adjusting an indicating device 70. A switching extension 71 projects from the tension rod 67 and adjusts a rotary selector switch 72 whose contacts 73 are connectible to non-illustrated attachments, for example to a tape hole-puncher or perforator. The double-armed sensing lever 43 is mounted on a stationary pin 74 and is subject to the biasing action of a tension spring 75 which holds a sensing pin 76 of a lever arm 77 in engagement with one of the control profiles 78 of the control disc 49 that is securely mounted on the shaft 79. A pinion 80 is mounted on the shaft 79 and is in meshing engagement with a toothed segment 81 located behind the toothed segment 34, as viewed in FIG. 1. The toothed segment 81 moreover meshes with a pinion 82 which is securely mounted on a hollow shaft 83 that is borne by the adjusting shaft 36. The pinion 82 is connected through a linkage or driver 84 with a differential control mechanism 85 of a further control key bank 86 which is constructed in a manner similar to the aforedescribed operational mode bank 11. The toothed segments 31 of the differential control mechanisms 29 and 85 mesh with gears 87 and 88 that are securely mounted on hollow shafts 89. One or more non-illustrated calculating mechanism selector banks can be provided in addition to the operational mode bank 11 and the control key bank 86 for controlling the calculating mechanisms that are yet to be described herein.

The introduction of the value data to be registered is effected by keys 90 (FIG. 2) which are disposed in value or amount key banks 91. The keys 90 of each amount key bank 91 cooperate, by means of the respective key shafts 92, with a control mechanism slider 93 which, through a linkage or driver 94, is connected to a sensing lever 95 of a differential control mechanism 96. The toothed segments 97 of the differential control mechanism 96 mesh with pinions 98 and 99 which are securely mounted on the afore-mentioned hollow shafts 89 which lead to the non-illustrated printing mechanism and are operatively connected through linkages or drivers 100 to coordinated indicator wheels 101 and rotary selector switches 102.

A tension rod 103 is pivotally secured to the sensing lever 95 and is suspended from a double-armed lever 105 which is rotatable on and about a pin 104. The double-armed lever 105 is located in driving connection with a toothed segment 106 mounted on the same pin 104 as well as, by means of a rod 107, to double-armed toothed segments 108 and 109 which are rotatably mounted on pins 110 and 111. The toothed segments 106 and 108 cooperate with adding mechanisms 112 and 113 of conventional construction type, and the toothed segments 108 and 109 cooperate with totalizing mechanisms 114 and 115 whose calculating wheels 116 and 117 as well as 118 and 119 in inwardly swung condition thereof are brought into meshing engagement with the coordinated toothed segments 106, 108 and 109 for the purpose of accepting or transfering a value or amount.

The respective summing and totalizing mechanisms, 112, 113, on the one hand, and 114, 115 on the other hand, are mounted on respective control shafts 120 to 123 (note also FIG. 3), on which there are respectively secured coupling or clutch levers 124 to 127, which serve for entraining or clutching the operational mode rails 128 to 131, respectively, that are displaced in the respectively adjusted mode of operation. The drive of the operational mode rails 129 and 131, which are guided in pin-slot connections 132, 133 and furnished in the rear thereof with toothed racks 134 and 135, respectively, is effected by a pinion 136, that is mounted on a hollow shaft 137, on which another non-illustrated pinion is mounted and meshes with a similarly non-illustrated arcuate gearing of the aforementioned bellcrank 66 (FIG. 1). The hollow shaft 137 is mounted on a shaft 138, which is provided with a non-illustrated pinion meshing with the forward operational mode rails 128 and 130 and a non-illustrated bellcrank which is firmly connected to the sensing lever 56 and is displaced oppositely to the bellcrank 66 for each machine run in the operational mode "Addition". Clutch levers 139, 140 and 141, 142 are pivotally mounted on the operational mode rails 128 and 130 and are provided with gap-gaugelike recesses 143 to 146 which, in clutched condition, receive therein, respectively, clutch pins 147 to 150 of the clutch levers 124, 125 and 127 as well as of a further clutch lever 151.

The clutch lever 151 is formed with two arms. It is mounted on a pin 152 and connected by a rod 153 to the clutch lever 126 which is securely mounted on the control shaft 123. The clutch pins 147 to 150 project through slots 154 formed in the operational mode rails 128 to 131. Behind the operational mode rails 129, 131 (as viewed in FIG. 3), which are displaceable into the different operational modes, clutch levers 155 to 158 are rotatably mounted. They are covered in FIG. 3 by the respective clutch levers 139 to 142 which are of the same construction.

The clutch operation of the clutch levers 139 to 142 and 155 to 158 is effected by spring-loaded sensing levers 160 to 167, which are disposed on a support plate 168 and are connected by linkages or drivers 169 to 176 with the clutch levers 139 to 142 and 155 to 158. In addition to the sensing levers 160 to 167, two additional sensing levers 177 and 178 are provided, which are operatively connected through linkages or drivers 179 and 180 to double-armed locking levers 183 and 184, that serve for arresting the control shafts 122 and 123 and can fall into recesses 185 and 186 of the control shafts 122 and 123, respectively, so as to prevent axial displacement of the shafts.

Figure 4:
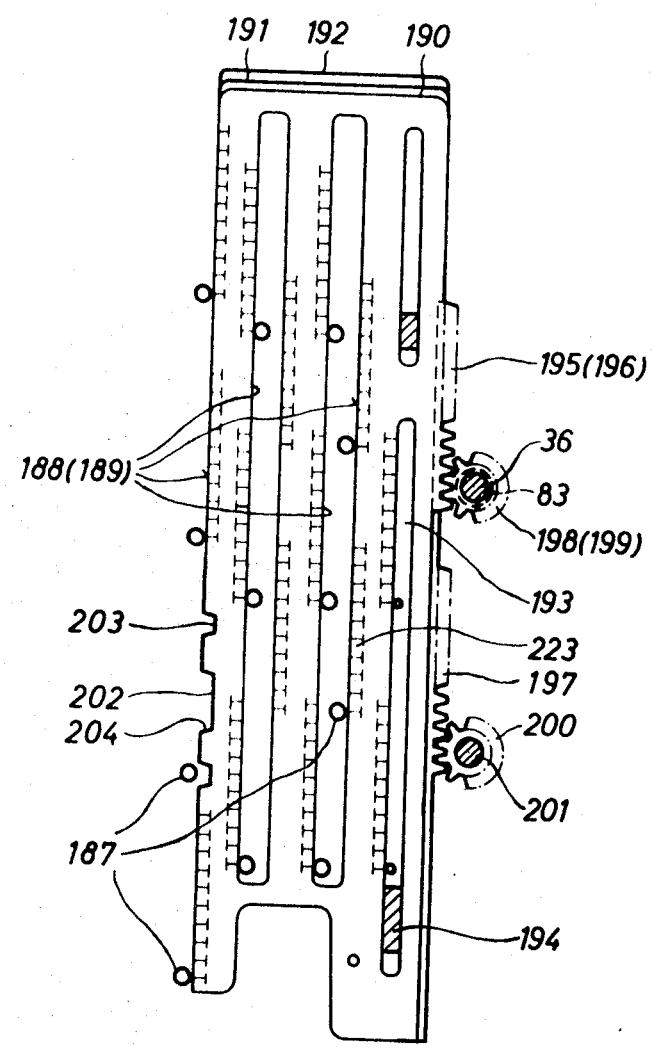
FIG. 4 is a side elevational view of a control slider for the calculating mechanism automatic selector device.

The sensing levers 160 to 167 and 177, 178 are provided with sensing pins 187 (note also FIG. 4) which cooperate with control profiles 188, 189 of control sliders 190 to 192 that are guided in pin-and-slot connections 193, 194 below the support plate 168 and are furnished with toothed racks 195, 196, 197. The toothed rack 195 of the control slider 190 meshes with a pinion 198 which is securely mounted on the aforementioned adjusting shaft 36 (FIG. 1) and is adjustable by the differential control mechanism 29 of the mode-of-operation bank 11, while the pinion 199, that is securely mounted on the hollow shaft 83, is driven by the differential control mechanism 85 of the control key bank 86. A pinion 200 meshing with the toothed rack 197 is provided on an adjusting shaft 201 below the pinions 198, 199, the shaft 201 being driven by the non-illustrated differential control mechanism of the summing mechanism selector bank. The control profiles 188, 189 of the control sliders 190 to 192 are formed with trapezoidal cut-outs or notches 202, 203 of varying width, though of the same depth, into which the sensing pins 187 can fall if all of the control sliders 190 to 192 have their notches or recesses 202, 203 in the same position. When the control sliders 190 to 192 are displaced, the spring-loaded sensing pins 187, that have fallen into the notches 202, 203 are forced outwardly by the inclined edges 204 of those notches.

Figure 2:
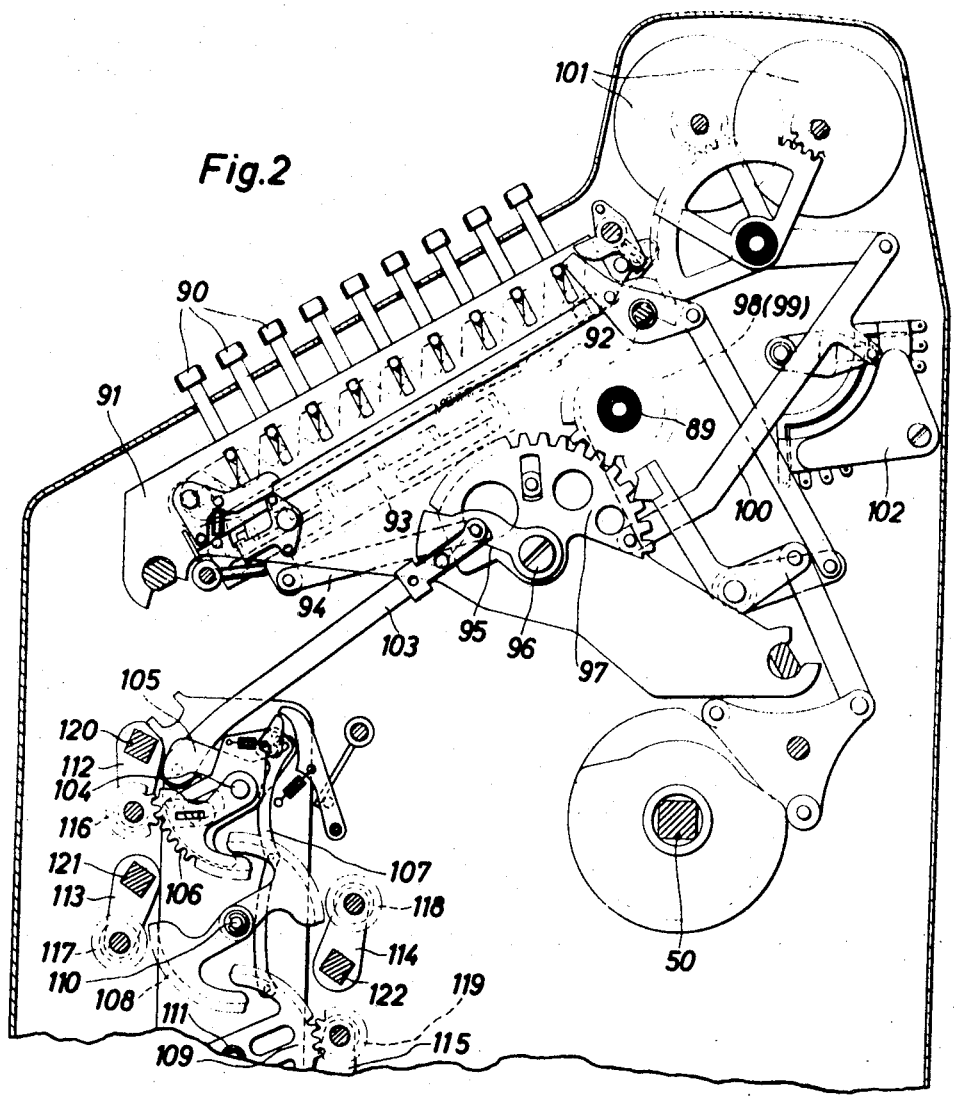
FIG. 2 is a further cross-sectional view of the bookkeeping machine.
Figure 6:
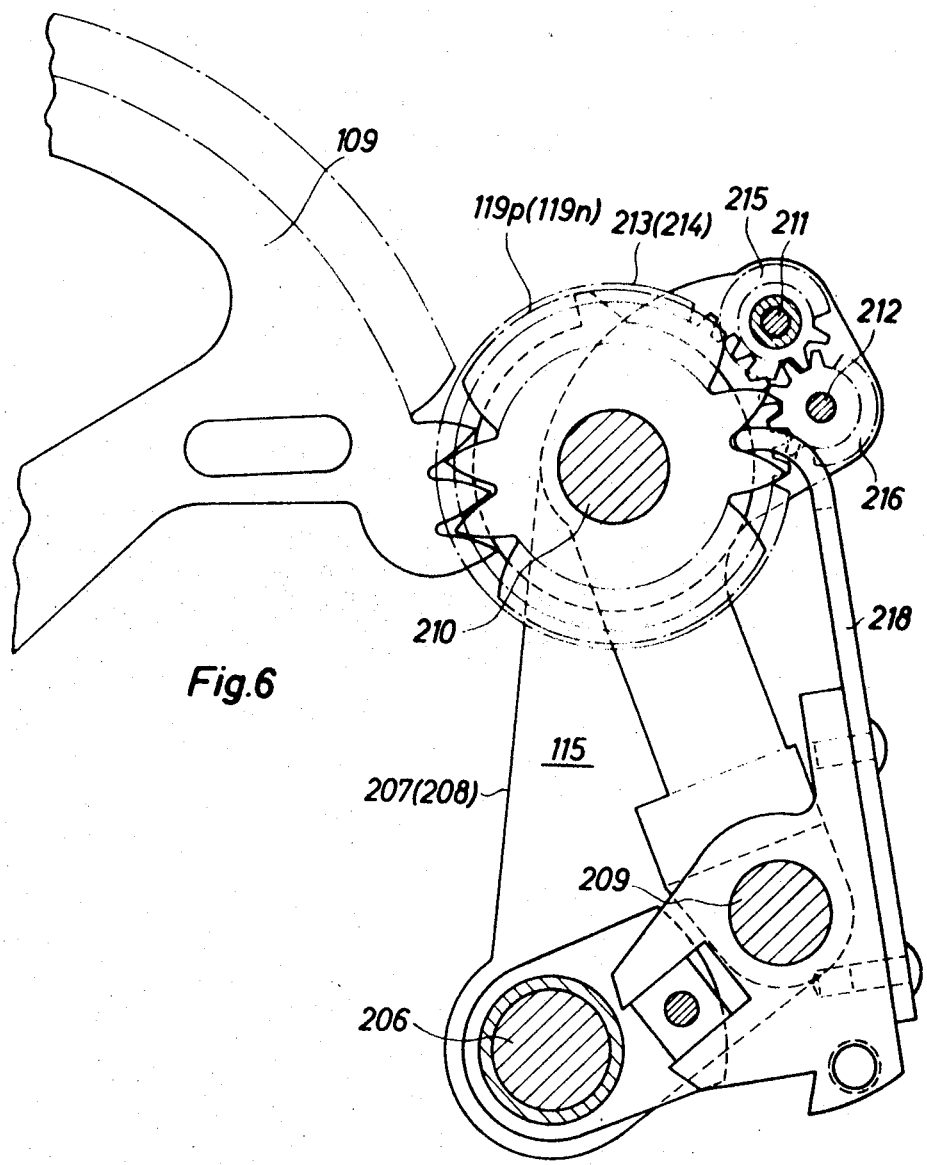
FIG. 6 is an enlarged side elevational view of the totalizing mechanism of FIG. 5.
Figure 7:
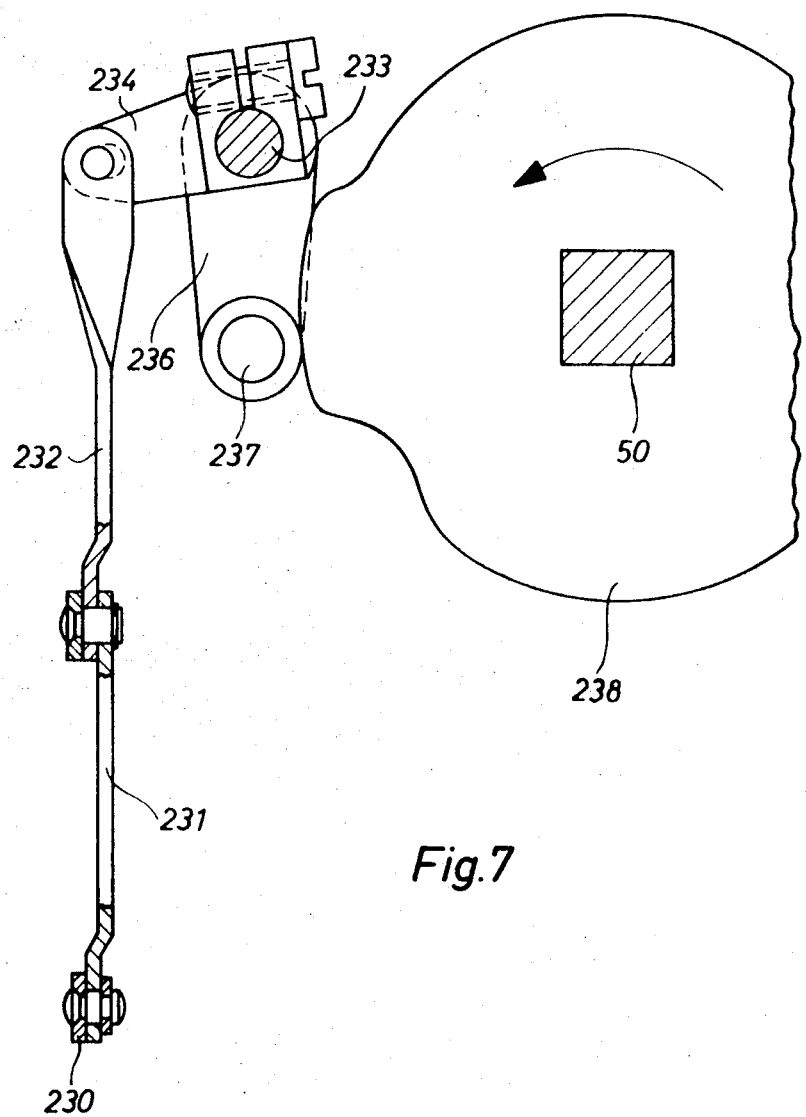
FIG. 7 is an enlarged front elevational view of details of the control system for the totalizing mechanism.

The control shaft 123 of the aforementioned totalizing mechanism 115 (FIGS. 2 and 5) is formed of a cylindrical shaft 206 (also see FIG. 6) on which there are mounted straps 207, 208 through which shafts 209 to 212 extend. On the shaft 210, the positive and negative calculating wheels 119p and 119n of the totalizing mechanism 115 are disposed in pairs and are riveted to gears 213, 214 which are connected in such manner through a double tooth-wheel drive 215, 216 mounted on the shafts 211, 212 that, when the one calculating wheel 119p is turned, the calculating wheel 119n turns in opposite rotary direction. The calculating wheels 119p or 119n of the totalizing mechanism 115 can be brought into meshing engagement respectively depending upon adjustment or setting with the toothed segments 109 (FIG. 2). The so-called "10s" shifting device as well as the device for carrying over the so-called fugitive "1" are well known and are therefore not shown or described herein. At an extension 217 of an arresting cap 218 there is suspended a tension spring 219 that is fastened at the other non-illustrated end thereof to a side wall 220. A tube 221 of square-shaped cross section is loosely slid onto the shaft portion 206 of the control shaft 123. The tube 221 passes through a suitably dimensioned hole 222' formed in a partition 222 and is provided with the aforementioned recess 186 which cooperates with the locking lever 184. The square-shaped tube 221 is protected laterally against axial displacement by the strap 207 and by a flange 223 of an additional tube 224 of square cross section which is firmly connected to the shaft 206 by means of the pins 225, 116. The shaft 206 extends through the machine wall 227 wherein a bore 228 is formed in which the clutch lever 126 is rotatably disposed. A locking roller 229 of a bellcrank 230 abuts the flange 223 and is operatively connected by means of a pair of linkages 231, 232 (note FIG. 7) with an adjusting lever 234 rigidly clamped on a control shaft 233. A sensing lever 236 is securely mounted on the control shaft 233 and is provided with a sensing roller 237 that is responsive to a control cam 238 which is mounted on the main shaft 50 of the machine. As soon as the control cam 238 releases the sensing lever 236, the bellcrank 230 that is subjected to the biasing action of the tension spring 219 turns clockwise, as viewed in FIG. 5, and the control shaft 123 is slid so far to the right-hand side of FIG. 5 that the negative calculating wheels 119n are located opposite the toothed segments 109.

The totalizing mechanism 114 (FIG. 2) is constructed and controlled in a similar manner.

The hereinbefore-described device operates in the following manner:

If a control key 13 to 19, for example, were to actuate the mode-of-operation bank 11, by means of which the machine run is released in a conventional manner, the differential control mechanism 29 shifts the control cam 38 and the control slider 190 coordinated therewith. The control cam 38 determines the respective mode of operation of the machine, and the control slider 190 the selection of the summing mechanisms 112, 113 and of the totalizing mechanisms 114, 115. Moreover, the control slider 190 determines if the positive or negative calculating wheels 119n and 119p are brought into meshing engagement with the tooth segments 109; because the tooth segments 109 are always used for transferring values in additions or subtractions as well as in subtotaling and grand totaling machine runs. The control becomes effective however, only in accordance with the conditions that the control sliders 191, 192 have corresponding cut-outs or notches 202, 203 in the adjusted or set position and the control cam 49 does not obstruct the displacements of the sensing lever 42.

In a business transaction wherein, however, a different control key 13 to 19 of the mode-of-operation bank 11 as well as a further control key of the control key bank 86 are to be actuated, in order to control the respective summing mechanisms 112, 113 and totalizing mechanisms 114, 115, the control sliders 190, 191 and the control cams 38 and 49 must be provided with corresponding recesses or notches 202, 203 and control profiles 40, 41, 78, either the control cam 49 or the control cam 38 determining the respective mode of operation that is dominant, i.e. released for controlling, because the sensing lever 43, if the sensing pin 45 thereof can fall into the control profile 41, arrests with one of the projections 46, 47 thereof, the sensing lever 42 which selects the respective cam disc pair 62 to 64.

An additional controlling component is provided by the addition of the control slider 192 which is coordinated with the calculating mechanism selector bank which thereby exerts an influence on the control of all of the calculating mechanisms.

In order to be able to determine the adjustment or setting of the totalizing mechanism by means of several sensing levers 240, 241 and 242, 243 (FIG. 8), for especially extensive control devices, several locking levers 246, 247 and 248, 249 disposed behind one another are located at the control shafts 244 and 245 of the totalizing mechanism and corresponding recesses 250, 251 (FIG. 9) and 252, 253 are coordinated therewith. The linkages 258 to 261 which are suspended on the sensing pins 254 to 257 of the sensing levers 240 to 243 are pivotally connected to the lever arms 262 to 265 which are rotatably mounted on shafts 266, 267 and control or influence by means of riveted-in spacer pins 268 to 271 the locking levers 246, 247 and 248, 249 which are rotatable on the same shafts 266 and 267. Additional notches 272, 273 can be provided for further locking levers so that the control shafts 244 and 245 of the coordinated totalizing mechanism can be arrested by several locking levers, if necessary. The arrest of the control shaft 244 is effected in the same manner as described hereinabove for the control shaft 123 by means of a flange 274 which is influenced or controlled by a locking roller 275 of an angle lever 276 adjustable by the main shaft 50 of the machine. Instead of the totalizing mechanism shown in FIGS. 5 and 6, a conventional totalizing machine of different construction can be used wherein the positive and negative calculating wheels, for example, are disposed above one another and are in direct meshing engagement one with the other. With such a totalizing mechanism, instead of the longitudinal displacement, a swinging movement is effected in order to effect intermeshing of the positive and negative calculating wheels.

Figure 5:
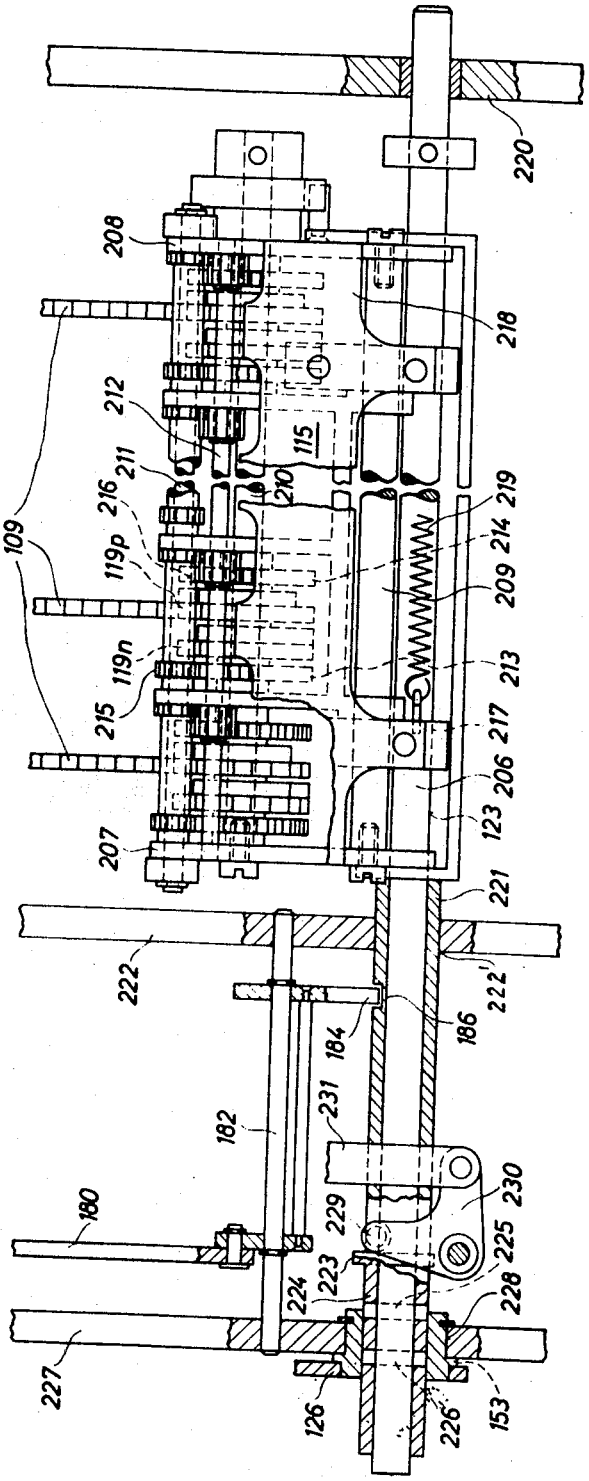
FIG. 5 is a rear elevational view of a totalizing mechanism of the bookkeeping machine.
Figure 10:
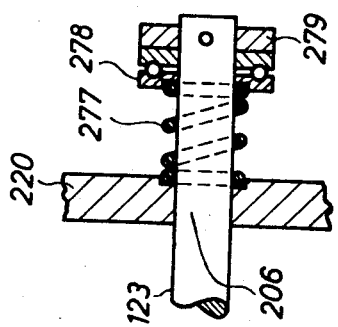
FIG. 10 is an enlarged fragmentary view of the totalizing mechanism control system showing further details thereof.

In addition, it is also possible, as seen in FIG. 10, to coordinate a compression spring 277 with the shaft portion 206 of the control shaft 123 instead of the tension spring 219 shown in FIG. 5, one end of the compression spring 277 abutting the machine wall 220 and the other end thereof acting on a compression bearing 278 which is mounted on the shaft 206 and abuts an adjusting ring 279.

Figure 11:
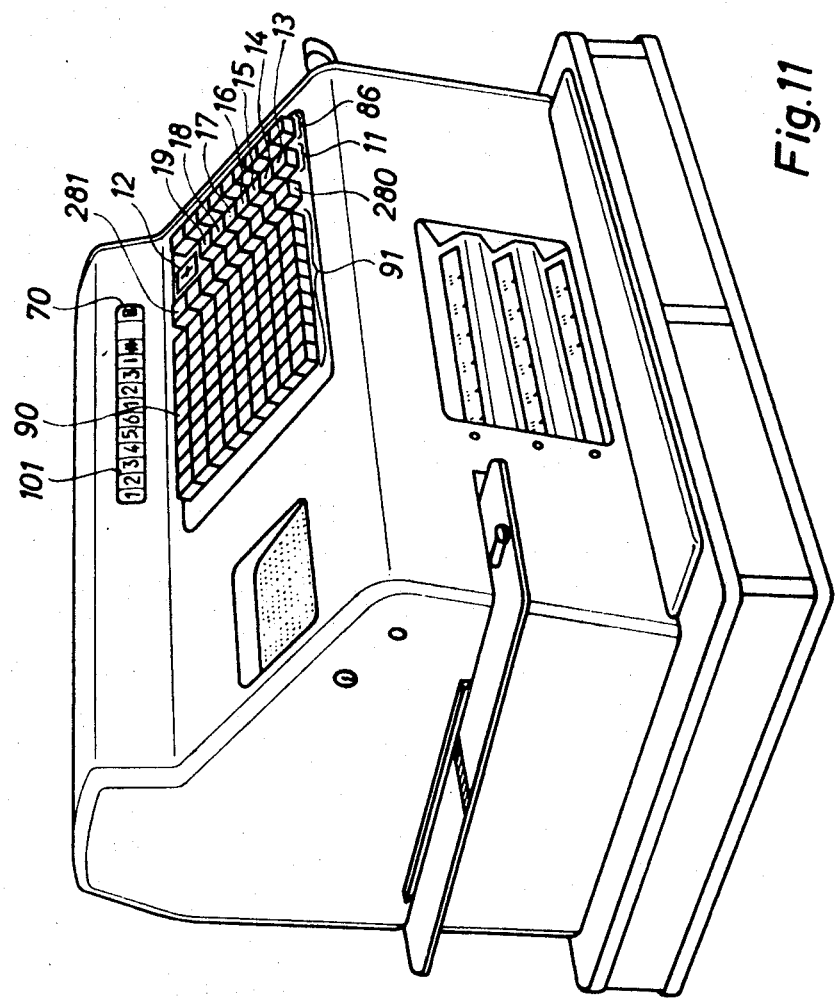
FIG. 11 is a perspective view of the bookkeeping machine of FIG. 1.

In addition to the mode-of-operation or mode-control bank and the control key bank 86, FIG. 11 also shows a calculating mechanism selector bank 280. The calculating mechanism selector bank 280 corresponds in construction to the mode-of-operation bank 11, shown in FIG. 1 of the instant application, however, as is readily apparent in FIG. 11, the bank 280 has nine calculating mechanism selector keys 281. The calculating mechanism selector bank 280 is also provided with a differential mechanism which serves for driving the pinion 200, shown in FIG. 4.

Figure 12:
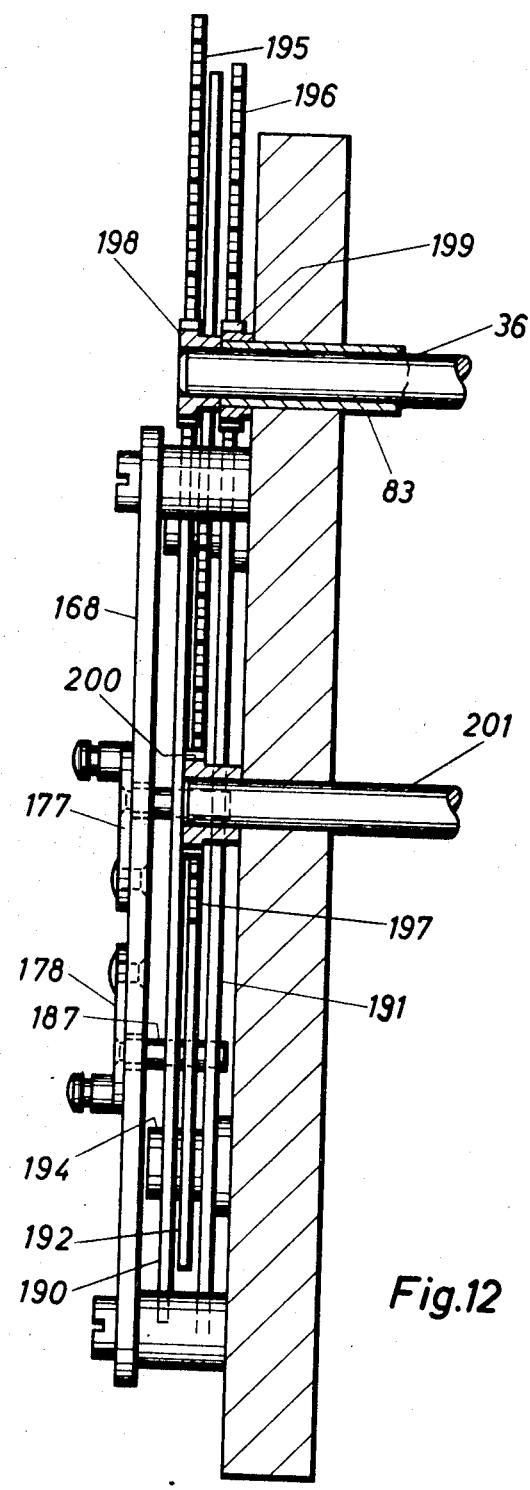
FIG. 12 is an enlarged fragmentary sectional view showing several of the components of FIGS. 3 and 4.

In FIG. 12, there are shown in greater detail and analogous to FIG. 29 of Becker U.S. Pat. No. 3,181,784, a cross-sectional view of the support plate 168 (FIG. 3 of the instant application), the control sliders 190 to 192 (FIG. 4 of the instant application) and the pinions 198, 199 and 200 (also FIG. 4 of the instant application). The pinion 198 is driven through the differential mechanism 29 of the mode-of-operation bank 11, as shown in FIG. 1, the pinion 199 by the differential mechanism 85, of the control key bank 86 and the pinion 200 by the non-illustrated differential mechanism of the calculating mechanism selector bank 280, shown in FIG. 11. The selection of the calculating mechanisms, i.e. the adding or summing mechanisms 112, 113 and the totalizing mechanisms 114, 115, occurs in the instant application basically in the same manner as shown in FIG. 25 of the patent to Becker. The special novelty of the present invention lies in the additional function performed by the control sliders 190 to 192 which not only select the calculating mechanisms 112 to 115, but, in addition, control the negative or positive calculating wheels of the totalizing mechanisms 114, 115, as claimed in claim 1 of the instant application.

As seen more clearly in FIG. 12, the sensing pinion 187 (note also FIGS. 3 and 4) extend against and engage the profiles of all three control sliders 190 to 192. Since each control slider 190 to 192 can be selectively transferred from the starting position thereof into nine other positions by means of the differential control mechanisms 29, 85 (FIG. 1) coordinated therewith, a great number of combinations is available. Each control slider 190 to 192 can effect the selection and shifting processes by itself or in combination with the other sliders.

Figure 8:
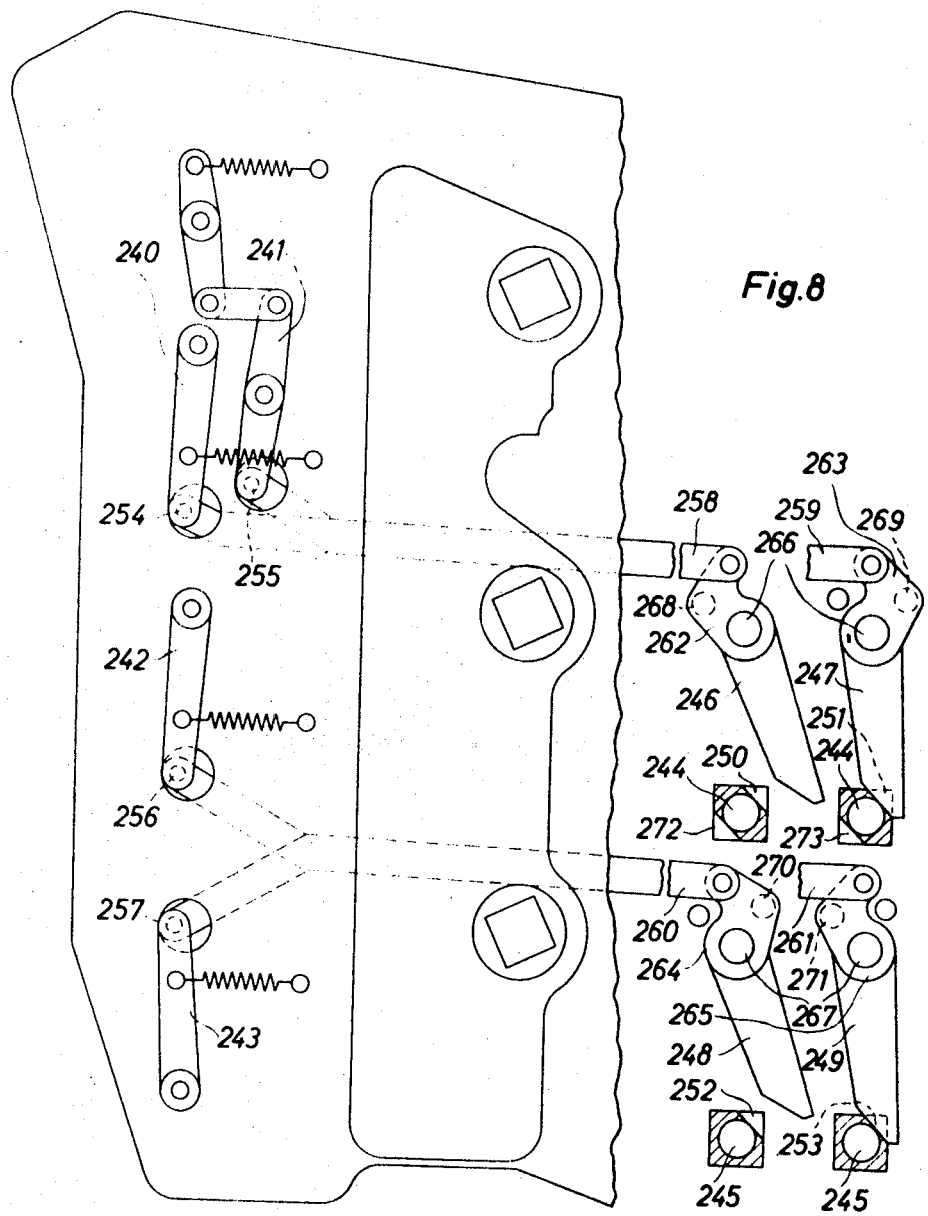
FIG. 8 is a side elevational view of a special embodiment of the totalizing mechanism control system.
Figure 9:
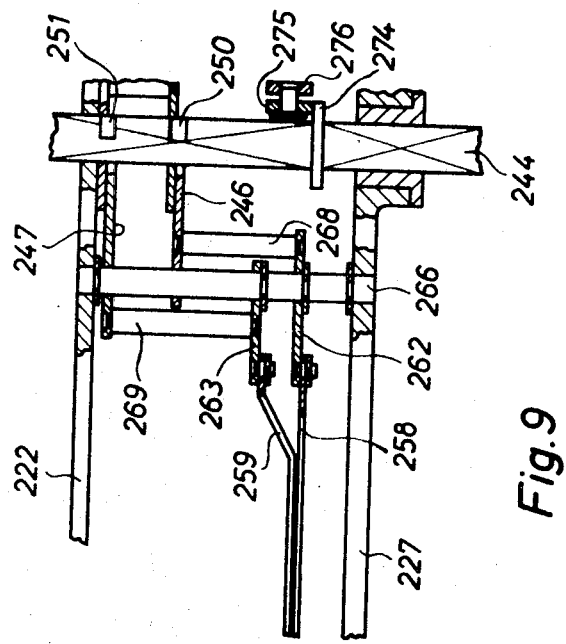
FIG. 9 is a fragmentary top plan view of FIG. 8 showing details of the totalizing mechanism control system.

In the construction of FIGS. 8 and 9 of the instant application, there is shown a control device according to the invention wherein one locking lever 183, 184 (FIG. 3) is insufficient for determining all positions of the totalizing mechanism 114 or 115 (FIG. 2) coordinated therewith. By providing two locking levers 246, 247 for the control shaft 244, which corresponds to the control shaft 122 of FIG. 3, eighteen adjustable positions for the totalizing mechanism associated therewith, are provided, whereas only nine positions are determinable with one locking lever 183 or 184. Actually, two positions would, in fact, suffice for selecting the positive or negative calculating wheels of the controlled totalizing mechanism. The three control sliders 190 to 192, however, have, in addition to the shifting or displacing function thereof, also the aforementioned selecting function and, when there are a considerable number of calculating mechanisms, nine positions are not enough for three or more control sliders 190 to 192 in order to be able to utilize all of the possibilities of control.

Figure 3:
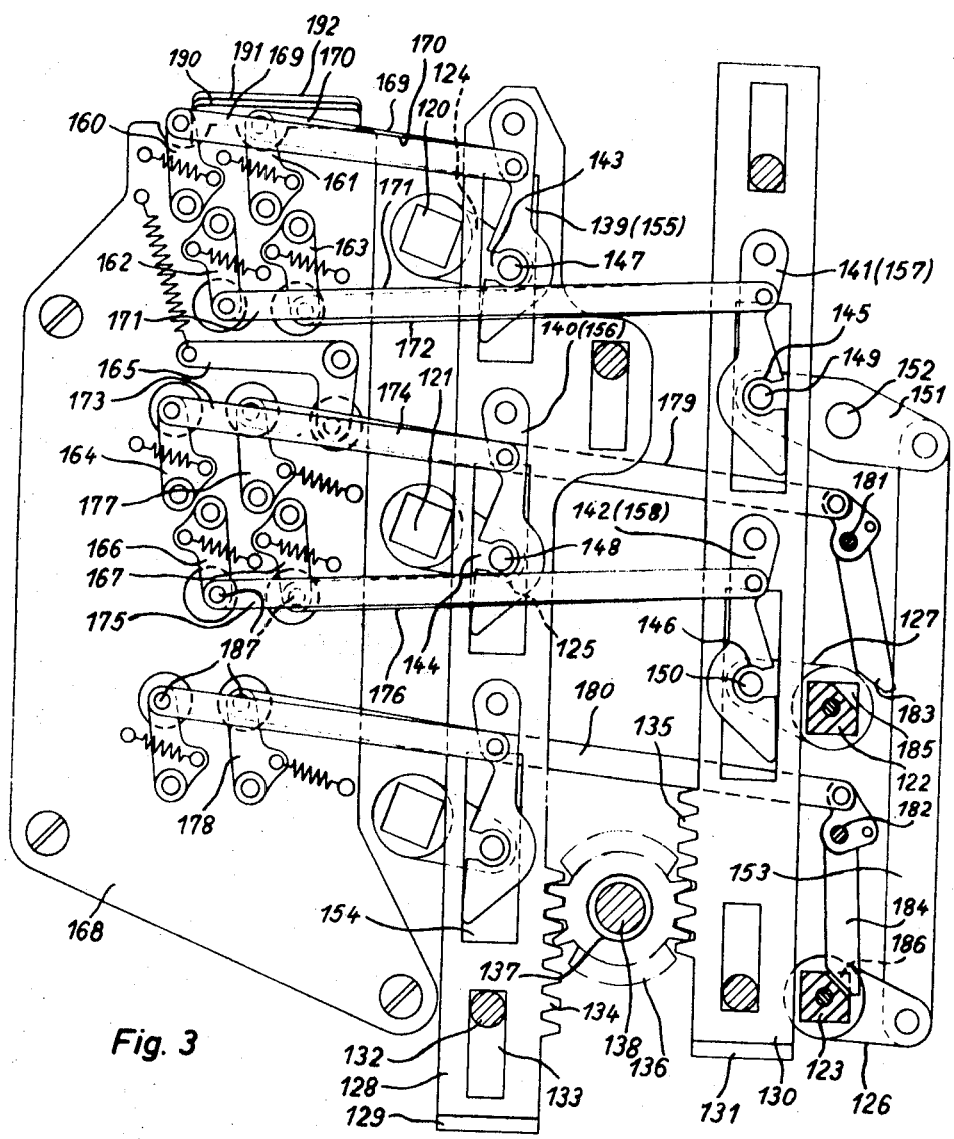
FIG. 3 is a side elevational view of the automatic selector device for the calculating mechanism of the bookkeeping machine.

The control shafts 244, 245 of the modified embodiments 8 and 9 of the instant application, correspond to the control shafts 122, 123 of FIGS. 2 and 3 of the instant application. The sensing levers 240, 243 of FIG. 8 are also actuated by modified control rods or sliders 190 to 192 according to FIG. 4. The calculating mechanism selector bank 280 is equipped with nine calculating mechanism selector keys 28, which cooperate with the aforementioned non-illustrated differential control mechanism.

I claim:

1. Control device for totalizing mechanisms of registering business machines comprising a plurality of calculating mechanisms including a plurality of summing mechanisms and a plurality of totalizing mechanisms, said plurality of totalizing mechanisms respectively having positive and negative calculating wheels, clutch members connected to said totalizing mechanisms, a plurality of calculating mechanism selector means operatively connected to said clutch members for acting thereon so as to select a respective individual totalizing mechanism from said plurality of totalizing mechanisms, control and calculating mechanism selector banks, at least one thereof having a differential mechanism operatively connected to said calculating mechanism selector means, respectively, for setting the same, each of said totalizing mechanisms being adjustable for activating said positive and negative calculating wheels thereof and being activatable and selectable by the same one of said calculating mechanism selector means.

2. Control device according to claim 1 wherein said plurality of calculating mechanism selector means are in the form of profiled control rods, and including control and calculating mechanism selector key banks operatively connected to said control and calculating mechanism selector banks, respectively, and each having one of said differential mechanisms operatively connected therewith, said profiled control rods being actuable selectively individually and in combination in accordance with a respective machine run.

3. Control device according to claim 2 wherein said calculating mechanism selector means are adapted to select simultaneously summing mechanisms of the machine as well as said totalizing mechanisms, and including locking means operatively connected to said calculating mechanism selector means and actuable thereby for locking said positive and negative calculating wheels of said totalizing mechanisms against activation of said wheels.

4. Control device according to claim 3 in a business machine having a drive, including resilient means connected to said totalizing mechanisms for urging the same in one direction, and actuating members operatively connected to said totalizing mechanisms and adjustable by the drive of the business machine for urging said totalizing mechanisms in a direction opposite to said one direction, said locking means comprising stops provided on said totalizing mechanisms, and locking members cooperating therewith, said locking members being operatively connected to said calculating mechanism selector means and being lockable with said stops in response to actuation of said calculating mechanism selector means.

5. Control device according to claim 4 wherein said profiled control rods of said calculating mechanism selector means are formed with control profiles, the position of said profiles at the beginning of a machine run determining activation of the positive and negative calculating wheels of said totalizing mechanisms as well as the selecting operation for said calculating and totalizing mechanisms.

6. Control device according to claim 1 wherein the business machine has "addition," "subtotal" and "sum total" modes of operation, and including at least one bank of control and calculating mechanism selector keys, said modes of operation as well as activation and selection of at least one of said totalizing mechanisms being determinable by at least one key of said bank of keys.

7. Control device according to claim 6 including a plurality of banks of control and calculating mechanism selector keys, said modes of operation as well as activation and selection of at least one of said totalizing mechanisms being determinable by a combination of several different keys of said banks of keys.

8. Control device according to claim 6 including means for adjusting the respectively selected totalizing mechanisms as well as the summing mechanisms of the business machine associated therewith in different modes of operation in the same machine run.

9. Control device according to claim 6 including a plurality of banks of control and calculating mechanism selector keys, control cams coordinated with said control key banks, cam discs operatively engaging said totalizing mechanisms, as well as calculating mechanisms of the business machine associated therewith, for pivoting the same, operational mode rails located adjacent said calculating and totalizing mechanisms and couplable therewith, a clutch connecting between said cam discs and said operational mode rails, and a sensing lever engageable in common by said control cams for controlling said clutch connection.

* * * * *